United States Patent Office 3,635,987
Patented Jan. 18, 1972

3,635,987
O-(THIOCARBAMOYL-PYRIDYL) PHOSPHATES AND PHOSPHOROTHIOATES
Kurt Gubler, Riehen, and Odd Kristiansen, Reinach, near Basel, Switzerland, assignors to Ciba-Geigy Corporation, Ardsley, N.Y.
No Drawing. Filed Mar. 24, 1970, Ser. No. 22,404
Claims priority, application Switzerland, Mar. 28, 1969, 4,802/69
Int. Cl. C07d *31/48*
U.S. Cl. 260—294.8 E     2 Claims

ABSTRACT OF THE DISCLOSURE

New O-(thiocarbamoyl-pyridyl) phosphates and phosphorothioates having pesticidal activity are disclosed. Pesticidal compositions and a method for controlling pests are further disclosed.

---

The present invention concerns new O-(thiocarbamoyl-pyridyl) phosphates and phosphorothioates, processes for the production of these esters, furthermore pesticial compositions, in particular insecticidal, nematocidal and acaricidal compositions containing the new phosphoric acid esters as active ingredients as well as methods for the control of pests using the new esters or compositions containing these esters as active ingredients.

The novel pesticidal O-(thiocarbamoyl)-pyridyl) phosphates and phosphorothioates correspond to the Formula I:

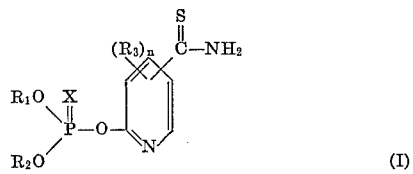

In this formula:

$R_1$ and $R_2$ independently each represent a lower alkyl radical or a lower alkyl radical substituted by lower alkoxy
$R_3$ represents halogen or a lower alkyl radical,
X represents oxygen or sulfur, and
$n$ represents an integer from 0 to 2.

In the general Formula I, by lower alkyl radicals $R_1$, $R_2$ and $R_3$ are meant those having 1 to 5 carbon atoms, such as the methyl, ethyl, a propyl, butyl or pentyl radical. $R_1$ and $R_2$ may be preferably lower alkyl radicals having 1 to 2 carbon atoms. Alkoxy substituents of lower alkyl radicals $R_1$ and $R_2$ preferably have 1 to 4 carbon atoms. $R_3$ preferably represents the methyl radical and by $n$ preferably an integer selected from the group of $n$ and 1 is to be understood. By halogen is meant, in particular chlorine or bromine. By X preferably sulfur is meant.

The novel O-(thiocarbamoyl-pyridyl) phosphates and phosphorothioates of Formula I are produced according to the invention by reacting in any order desired and in the presence of an inorganic or organic base, a cyano-2-hydroxy-pyridine compound of Formula II:

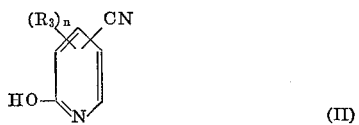

wherein $R_3$ and $n$ have the meanings given for Formula I, with a phosphoric acid halide of Formula III:

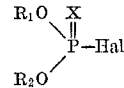

wherein

Hal represents chlorine or bromine, and
$R_1$, $R_2$ and X have the meanings given for Formula I, and with hydrogen sulfide. The intermediate products obtained, depending on the reaction sequence chosen, are either a compound of the Formula IV or a compound of the Formula V:

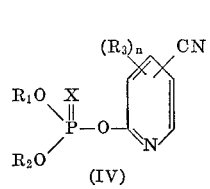 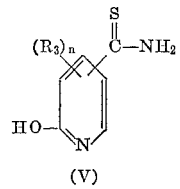

The symbols $R_1$, $R_2$, $R_3$ and $n$ have the meanings given for Formula I.

For the reaction of a cyano-hydroxy-pyridine of Formula II or a thiocarbamoyl-hydroxy-pyridine of Formula V with a phosphoric acid halide of Formula III, an inorganic base is preferably used as acid-binding agent. Primarily suitable for this purpose are the carbonates of alkali metals, alkaline earth metals and ammonium, as well as alkali metal and alkaline earth metal hydroxides. The conversion of the cyano group into a thiocarbamoyl group with hydrogen sulfide, on the other hand, requires primarily organic bases such as tertiary amines, in particular pyridine, triethylamine, etc. It is advisable to perform this conversion in the presence of a mixture of tertiary amines, so that the amines employed can also serve simultaneously as solvent. In addition, other solvents, for example alkanols, ketones, etc. can also be used.

The phosphorylation of the compounds of Formulas II or V is preferably performed in the presence of solvents or diluents which are inert towards the reaction components, for example in the presence of ketones such as acetone, methyl ethyl ketone, etc.; ethers and ether-type compounds, alcohols, amides, hydrocarbons and halogenated hydrocarbons, etc.

Besides the conversion of the cyanopyridine compounds of Formula II with hydrogen sulfide into the corresponding thiocarbamoyl compounds, this conversion can also be performed (a) with thioacetamide and (b) with O,O-diethyl phosphorodithioate and HCl. In addition, the thiocarbamoyl compounds can be obtained by treating the carboxylic acid amide with phosphorus pentasulfide in the presence of a tertiary amine.

Activity tests with compounds of the general Formula I against pests, in particular against insects, nematodes and arachnids, showed that these active substances are good to very good stomach and contact poisons combined with a systemic insecticidal action.

It has thus been found that the active substances of the general Formula I have an excellent, long-lasting effect against insects of the families Muscidae, Stomoxidae and Culicidae, e.g. against the polyvalent-resistant and normally sensitive house flies (*Musca domestica*), stable flies (*Stomoxys calcitrans*) and mosquitoes (e.g. *Aedes Aegypti*, *Culex fatigans*, *Anophenles stephensi*); against insects of the families Curculionidae, Bruchididae, Dermestidae, Tenebrionidae and Chrysomelidae, e.g. granary weevils (*Sitophilus granarius*), bean beetles (*Bruchidius obtectus*), larder beetles (*Dermestes vulpinus*), mealworms (*Tenebrio molitor*), Colorado potato beetles (*Leptinotarsa decemlineata*) and their larval stages; against insects of the family Pyralididae, e.g. Mediterranean flour moths (*Ephestia kuhniella*), of the family Blattidae, e.g. cockroaches (*Phyllodromia germanica, Periplaneta americana, Blatta orientalis*), of the family Aphididae, e.g. bean aphids (*Aphis fabae*), of the family Pseudococcidae, e.g. ctirus mealybugs (*Planococcus citri*) and of the family Locustidae, e.g. migratory locusts (*Locusta migratoria*).

Tests on the said bean aphids and migratory locusts indicate a systemic action.

In addition, the active substances of the Formula I according to the invention have a good action on the larval and adult stages of arachnids, in particular ticks, e.g. of the families Ixodidae and Argasidae.

The novel compounds of Formula I show excellent nematocidal and systemic nematocidal properties, e.g. against the following plant-parasitical nematodes: Meloidogyne spp., Heterodera spp., Ditylechus spp., Pratylenchus spp., Paratylenchus spp., Anguina spp., Heliocotylenchus spp., Tylenchorhynchus spp., Rotylenchulus spp., *Tylenchulus semipenetrans, Radopholus similus,* Belonolaismus spp., Trichodorus spp., Longidorus spp., Aphelenchoides spp., Ciphinema spp.

In admixture with synergists such as dibutyl succinate or piperonyl butoxide and auxiliaries having a similar action such as olive oil or peanut oil, the range of action of the said active substances can be broadened and in particular the insecticidal and acaricidal action can be improved. Likewise, the insecticidal action can be substantially broadened and adjusted to the prevailing circumstances by the addition of other insecticides such as, for example, phosphoric, phosphonic, thio- and dithiophosphoric acid esters and amides, carbamic acid esters, halogenated hydrocarbons such as dichlorodiphenyltrichloroethane and analogs thereof, pyrethrines and synergists thereof.

Insecticidal action

The insecticidal action as a stomach poison for chewing and sucking insects was determined by the following test:

Potted test plants were sprayed with a 0.05% aqueous suspension of active substance, prepared from a 40% wettable powder. After the spray-coating had dried, the test animals were placed on the parts of the plants above the ground which had been sprayed. The plants were then kept in a greenhouse at 24° C. and 70% humidity:

| Test plants | Test animals |
| --- | --- |
| Cabbage | 10 cutworms, 3rd development stage. |
| Cotton | 10 cotton worms, 3rd development stage. |
| Potatoes | 5 Colorado potato beetles, 2nd development stage. |

For evaluation of the test, the time in hours which elapsed until all of the animals were no longer able to move or suck was determined.

| | 100% kill of test animals in hours | | |
| --- | --- | --- | --- |
| Compound | Cutworms | Cotton worms | Colorado potato beetles |
| O,O-diethyl O-[5-thiocarbamoyl-pyridyl(2)] phosphorothioate | 5 | 24 | 24 |
| O,O-di-n-propyl O-[5-thiocarbamoyl-pyridyl(2)] phosphorothioate | | 24 | 24 |

During the test it was found that the active substances according to the invention have an excellent, long-lasting effect. Even 3 days after the test began, test animals which had been placed on the plants were killed within 24 hours.

Acaricidal action

Tick larvae (*Ornithoderus moubata*, 2nd development stage) were killed within 24 hours after dipping in a 0.1% solution of the active substance.

Nematocidal activity

To test the effectiveness against soil nematodes, the active substance is added in the given concentrations to soil infested with root gall nematodes and intimately mixed. In test series A, young tomato plants are transplanted into the prepared soil, and in test series B, tomato seeds are planted after a waiting period of 8 days.

To evaluate the nematocidal effect, the number of galls found on the roots of the plants are counted 28 days after planting or sowing, respectively. The following scale is used for the evaluation:

0=complete nematocidal effect=no infestation
5=no nematocidal effect=same infestation as the control
2–4=intermediary degrees of infestation

| | Nematocidal effect at a concentration of active substance of— | | | |
| --- | --- | --- | --- | --- |
| | 0.005% | | 0.001% | |
| Compound | A | B | A | B |
| O,O-diethyl-O-[5-thiocarbamoyl-pyridyl-(2)] phosphorothioate (according to the invention) | 0 | 0 | 2 | 4 |
| 1,2-dibromo-3-chloropropane [1] | 5 | 5 | 5 | 5 |
| 1,3-dichloropropene [1] | 4 | | 5 | |

[1] Known commercial products.

As is shown by the above tests, the active substance according to the invention has an excellent nematocidal action, whereas, in contrast thereto, the known commercial products compared therewith showed practically no effect. In addition it has been determined that the active substance according to the invention which was employed, is not phytotoxic.

The following examples illustrate the production of the active substances according to the invention, or of their starting materials. Temperatures are expressed in degrees centigrade.

EXAMPLE 1

A suspension of 12 g. of 2-hydroxy-5-cyano-pyridine and 13.8 g. of potassium carbonate in 200 ml. of methyl ethyl ketone is first refluxed for 3 hours and then, during 30 minutes, a solution of 18.9 g. of O-chloro O,O-diethyl phosphorothioate in 20 ml. of methyl ethyl ketone is added and then heated again for 17 hours. After cooling, the precipitate is separated and the filtrate distilled in vacuum. The residue is taken up in ether, washed with water, aqueous sodium bicarbonate solution and again with water, dried over sodium sulfate and freed of the solvent. The O-[5-cyano-pyridyl(2)] O,O-diethyl phosphorothioate has a refraction index $n_D^{20}$: 1.5284.

2.8 g. of this ester is then treated with 2.7 g. of pyridine and 1.1 g. of triethylamine and in a closed apparatus treated with hydrogen sulfide gas in such a manner that a constant excess pressure of 75 mm. Hg is maintained. After 2 hours, the mixture is poured into ice water, the precipitate is removed by filtration and recrystallized from ether/petroleum ether. The O-[5-thiocarbamoyl-pyridyl-(2)] O,O-diethyl phosphorothioate has a melting point of 72–73°.

EXAMPLE 2

Hydrogen sulfide gas is introduced for 10 hours into a solution of 66.9 g. of 2-hydroxy-5-cyano-pyridine in 1300 ml. of pyridine and 925 ml. of triethylamine. The thioamide crystallizes and has a melting point of 238 to 239°.

A suspension of 4.7 g. of 2-hydroxy-5-thiocarbamoyl-pyridine, 4.2 g. of potassium carbonate in 150 ml. of methyl ethyl ketone is refluxed for 3 hours, then treated during 20 minutes with a solution of 6.5 g. of O-chloro O,O-di-n-propyl phosphorothioate in 30 ml. of methyl ethyl ketone and again refluxed for 4 hours. After cooling, the precipitate is separated, the filtrate is concentrated in vacuum and the residue is taken up in ether. The ethereal solution is washed with water, aqueous sodium hydroxide solution and again with water, dried and distilled. The O-[5-thiocarbamoyl-pyridyl(2)] O,O-di-n-propyl phosphorothioate has, after recrystallization from ether/petroleum ether, a melting point of 95 to 97°.

By using the appropriate 2-hydroxy-cyano-pyridines and halogenophosphoric acid esters as starting materials, the O-[thiocarbamoyl-pyridyl(2)] phosphates listed in the following table were obtained in the manner described in the previous examples:

TABLE

| Compounds | Melting point/ boiling point, ° |
|---|---|
| 1. O-[5-thiocarbamoyl-pyridyl(2)] O,O-dimethyl phosphorothioate | |
| 2. O-[5-thiocarbamoyl-pyridyl(2)] O,O-dimethyl phosphate | |
| 3. O-[5-thiocarbamoyl-pyridyl(2)] O,O-di-n-butyl phosphorothioate | 104 |
| 4. O-[5-thiocarbamoyl-pyridyl(2)] O,O-di-n-butyl phosphate | |
| 5. O-[5-thiocarbamoyl-pyridyl(2)] O,O-diethyl phosphate | |
| 6. O-[5-thiocarbamoyl-pyridyl(2)] O,O-di-n-propyl phosphate | |
| 7. O-[5-thiocarbamoyl-pyridyl(2)] O-methyl O-isopropyl phosphorothioate | |
| 8. O-[3-chloro-5-thiocarbamoyl-pyridyl(2)] O,O-diethyl phosphorothioate | |
| 9. O-[3-bromo-5-thiocarbamoyl-pyridyl(2)] O,O-diethyl phosphorothioate | |
| 10. O-[4,6-dimethyl-5-thiocarbamoyl-pyridyl(2)] O,O-diethyl phosphorothioate | |
| 11. O-[6-thiocarbamoyl-pyridyl(2)] O,O-diethyl phosphorothioate | |
| 12. O-[6-thiocarbamoyl-pyridyl(2)] O,O-dimethyl phosphorothioate | |
| 13. O-[4-methyl-6-thiocarbamoyl-pyridyl(2)] O,O-diethyl phosphorothioate | |
| 14. O-[6-thiocarbamoyl-3(5)-methyl-pyridyl(2)] O,O-diethyl phosphorothioate | |
| 15. O-[5-thiocarbamoyl-pyridyl(2)] O,O-diallyl phosphorothioate | |
| 16. O-[5-thiocarbamoyl-pyridyl(2)] O,O-di-β-chloroethyl phosphorothioate | |
| 17. O-[5-thiocarbamoyl-pyridyl(2)] O,O-dimethoxymethyl phosphorothioate | |
| 18. O-[5-thiocarbamoyl-pyridyl(2)] O,O-di-β-methoxyethyl phosphorothioate | |
| 19. O-[6-thiocarbamoyl-pyridyl(2)] O,O-diethyl phosphorothioate | 51–53 |
| 20. O-[6-methyl-3-thiocarbamoyl-pyridyl(2)] O,O-diethyl phosphorothioate | 205–206 |

The production of pesticidal, especially insecticidal, nematocidal and acaricidal compositions containing the novel active substances of general Formula I according to the invention is performed in a known manner by intimately mixing and grinding the active substances of general Formula I with suitable carriers, optionally with the addition of dispersing agents or solvents, which are inert towards the active substances. The novel active substances can be prepared in the following forms:

solid preparations: dusts, scattering compositions, granulates, (coated granulates, impregnated granulates and homogeneous granulates);
water-dispersible concentrates of the active substance: wettable powders, pastes, emulsions;
liquid preparations: solutions, aerosols.

The concentration of active substance in these preparations is up to 90%, preferably from 0.01 to 80%. The concentration for applying the active substances in those compositions which are ready-for-use is generally in practice about less than 2%, preferably from 0.01 to 1%. Other biocidally active substances or agents can be admixed with the compositions according to the invention. Thus, in addition to the said active substances of the general Formula I and salts thereof, the new compositions may contain, for example, other insecticides and acaricides, furthermore, also fungicides, bactericides, fungistatic and bacteriostatic substances or nematocides in order to broaden the range of action. The compositions according to the invention may also contain plant fertilizers, trace elements, etc.

The new active substances are employed for the disinfection of the soil in solid or liquid form. Especially advantageous for soil disinfection are those compositions which guarantee an even distribution of the active substance throughout a layer of soil about 15 to 25 cm. deep. The manner of application and the application form depend in particular on the type of soil pests to be controlled, the climate and soil conditions. Since the new active substances are not phytotoxic and do not adversely affect seed germination, they can be used directly before or after sowing or planting without the necessity of a waiting period. Likewise, growing plants can also be treated with the new agents. Since the active substances possess pronounced systemic properties, they can also be applied just to the parts of the plants which are above the ground.

The following forms for application of the pesticidal, in particular insecticidal, nematocidal and acaricidal compositions according to the invention are presented to illustrate the invention; if not expressly stated otherwise, "parts" means parts by weight.

Dust

The following components are used to produce (a) a 10% and (b) a 2% dust:

(a)

10 parts of O-[5-thiocarbamoyl-pyridyl(2)] O,O-diethyl phosphorothioate
5 parts of highly dispersed silicic acid
85 parts of talcum (b)

2 parts of O-[5-thiocarbamoyl-pyridyl(2)] O,O-di-n-propyl phosphorothioate
1 part of highly dispersed silicic acid
97 parts of talcum The active substances are mixed and ground with the carriers. The dusts obtained are suitable, for example, for the control of cockroaches and ants in buildings.

Scattering composition

The following components are used to produce a 25% scattering composition:

25 parts of O-[5-thiocarbamoyl-pyridyl(2)] O,O-di-n-butyl phosphorothioate
0.25 part of an emulsifying agent (alkylarylpolyethylene glycol/calcium alkylaryl sulfonate),
50 parts of kieselguhr
24.75 parts of hydrous calcium sulfate The active substance is intimately mixed with the emulsifying agent and the kieselguhr and then the calcium sulfate is mixed in. A scattering composition is obtained that is especially suited for disinfection of the ground.

Scattering composition

The following components are used to produce a 5% scattering composition:

5 parts of O-[5-thiocarbamoyl-pyridyl(2)] O,O-diethyl phosphorothioate
35 parts of talcum
60 parts of calcium carbonate The active substance is intimately mixed with the carriers. A scattering composition is obtained that is especially suited for disinfection of the ground and for the control of nematodes.

Wettable powder

The following components are used to produce (a) a 50%, (b) a 40% and (c) a 10% wettable powder:

(a)

50 parts of O-[5-thiocarbamoyl-pyridyl(2)] O,O-diethyl phosphorothioate 5 parts of naphthalene sulfonic acid/benzene sulfonic acid/formaldehyde condensation product (3:2:1)
5 parts of Champagne chalk
20 parts of silicic acid
15 parts of kaolin
5 parts of sodium oleoylmethyltauride (b)

40 parts of O-[5-thiocarbamoyl-pyridyl(2)] O,O-di-n-propyl phosphorothioate
5 parts of magnesium carbonate
4 parts of sodium salt of sulfonated hexadecylglycol (condensed with 1.5 mol of ethylene oxide)
4 parts of calcium lignin sulfonate
2 parts of Champagne chalk/hydroxyethyl cellulose mixture (1:1)
45 parts of sodium aluminum silicate (c)

10 parts of O-[5-thiocarbamoyl-pyridyl(2)] O,O-di-n-butyl phosphorothioate
3 parts of a mixture of the sodium salts of saturated fatty alcohol sulfates
5 parts of naphthalene sulfonic acid/formaldehyde condensation product
82 parts of kaolin The active ingredients are intimately mixed with the additives in suitable mixers and ground in mills and rollers. Wettable powders are obtained which can be diluted with water to form suspensions of any desired concentration. Such suspensions are used for the control of chewing and sucking insects.

Emulsion concentrate

To produce a 25% emulsion concentrate 25 parts of O-[5-thiocarbamoyl-pyridyl(2)] O,O-diethyl phosphorothioate
2.5 parts of epichlorohydrin
5 parts of an emulsifying agent (alkylarylpolyethyleneglycol/calcium alkylarylsulfonate), and
67.5 parts of xylol are mixed together. This concentrate can be diluted with water to obtain emulsions suitable for the protection of plants and stored goods. Such emulsions are particularly suitable for the control of insects in store rooms, in warehouses and on cultivated plants.

We claim:

1. A member selected from the group consisting of O-(thiocarbamoyl-pyridyl) phosphates and phosphorothioates of the Formula I:

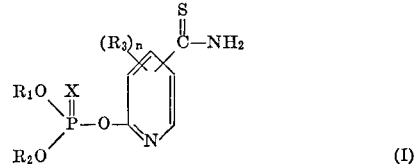

(I)

wherein
$R_1$ and $R_2$ independently each represent a lower alkyl radical or a lower alkyl radical substituted by lower alkoxy,
$R_3$ represents halogen or a lower alkyl radical,
X represents oxygen or sulfur, and
$n$ represents an integer from 0 to 2.

2. The compound O-[5-thiocarbamoyl-pyridyl(2)] O,O-diethyl phosphorothioate.

References Cited

UNITED STATES PATENTS 3,399,205    8/1968    Rigterink _____ 260—294.8
3,535,325   10/1970    Gubler et al. _____ 260—294.8

HENRY R. JILES, Primary Examiner
G. T. TODD, Assistant Examiner

U.S. Cl. X.R.

260—294.9; 424—266